(No Model.) 2 Sheets—Sheet 2.

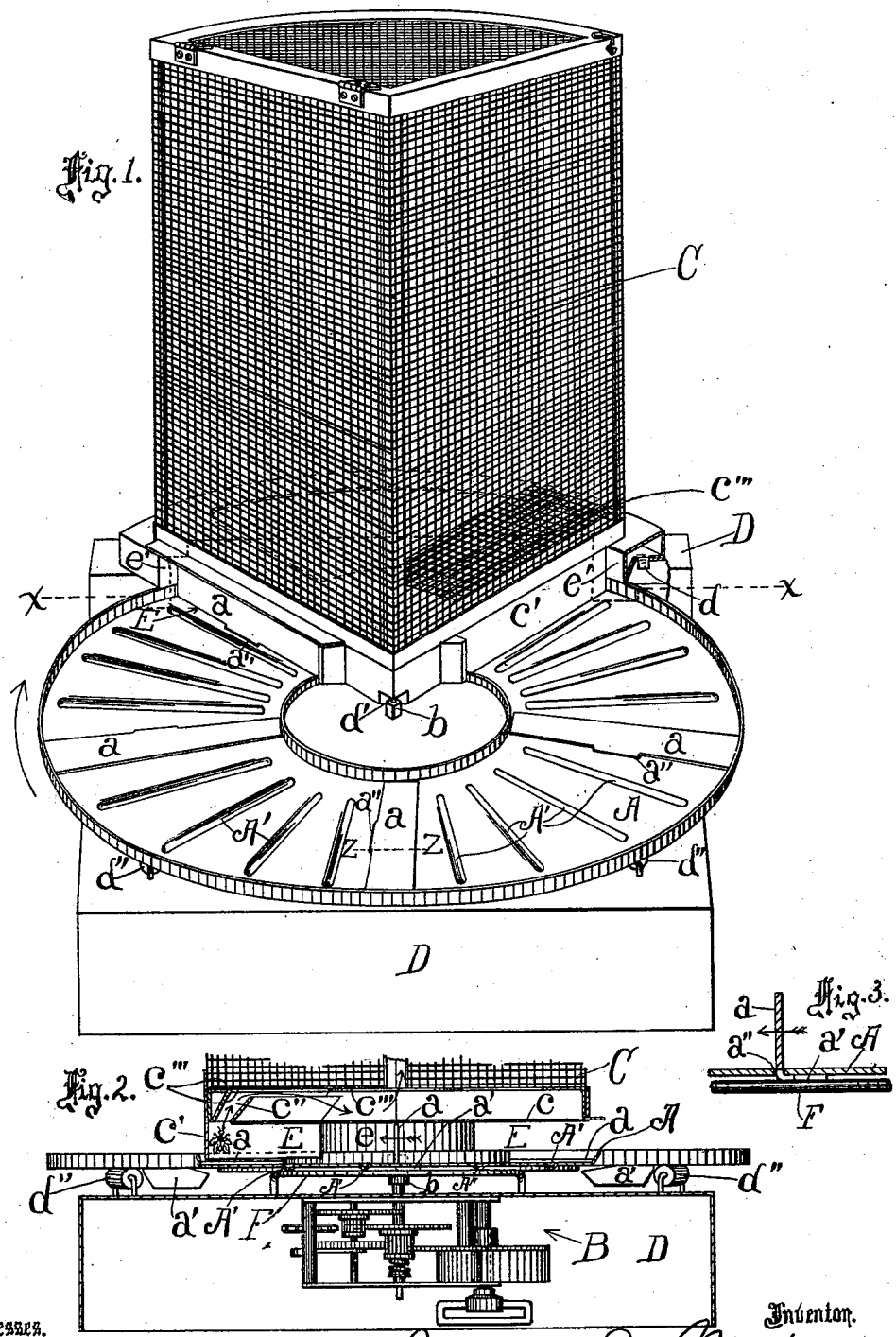

J. S. MORTON.
FLY TRAP.

No. 507,630. Patented Oct. 31, 1893.

Witnesses. Inventor.
M. M. Gee. Jasper S. Morton
F. M. Townsend. by Edgard V. Townsend
his Atty

UNITED STATES PATENT OFFICE.

JASPER S. MORTON, OF LOS ANGELES, CALIFORNIA.

FLY-TRAP.

SPECIFICATION forming part of Letters Patent No. 507,630, dated October 31, 1893.

Application filed February 17, 1893. Serial No. 462,681. (No model.)

*To all whom it may concern:*

Be it known that I, JASPER S. MORTON, a citizen of the United States, residing at Los Angeles, in the county of Los Angeles and State of California, have invented a new and useful Improvement in Fly-Traps, of which the following is a specification.

My invention relates to that class of fly traps in which a revolving disk operates to carry the flies in under a wire screen receptacle into which they are directed and caged.

The object of my invention is to produce a fly trap of this character which will be simple and cheap in its construction and which will effectually prevent the escape of the flies from the trap after they are fully carried under the receptacle.

My invention consists essentially in a fly trap having a fly receptacle and a passage way leading into such receptacle and a disk arranged with a part of its plane extending beneath such receptacle to form the floor of such passage way, and provided with a series of movable partitions pivoted or hinged to such disk and arranged to fold upon such disk, and to be raised therefrom to stand at an angle therewith to close such passage way, such passage way being closed at its rear end by a stop arranged to prevent the passage therebeyond of the flies and to allow the passage therebeneath of the partitions when folded upon the disk, and suitable means arranged to hold the partitions elevated to close such passage way when passing therethrough and to allow them to fold against the disk to pass beneath the stop.

My invention also consists in the peculiar arrangement of the slot through which the flies enter the receptacle, and whereby they are prevented from returning to the passage way.

The accompanying drawings illustrate my invention.

Figure 4:
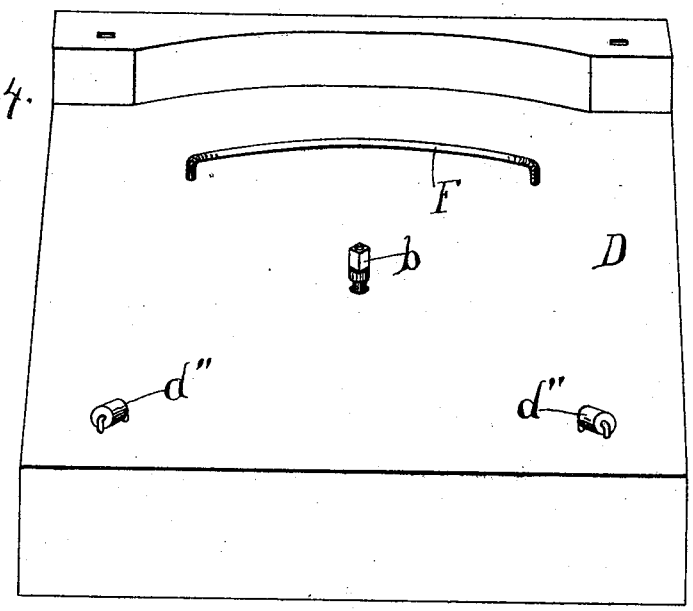
Figure 5:
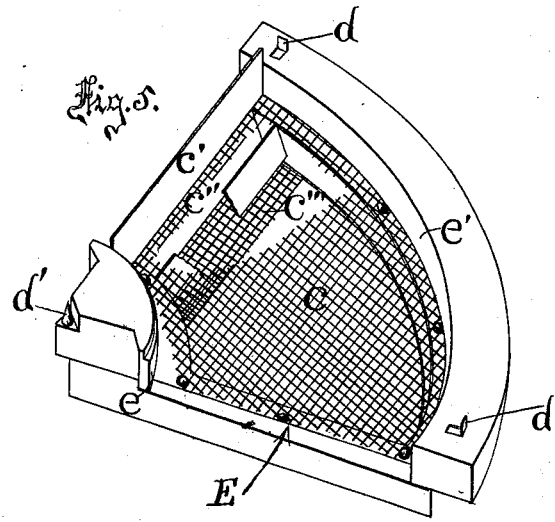

Figure 1 is a perspective elevation of a device embodying my invention. Fig. 2 is a fragmental sectional view looking from the rear of Fig. 1. Line $x$—$x$ Fig. 1 indicates the line of section. Fig. 3 is a fragmental sectional view looking from the rear of Fig. 1 showing one of the partitions $a$ in the position shown in Fig. 2 and a portion of the disk and fender. Line $z$—$z$ Fig. 1 indicates the line of section looking toward the center of the disk. Fig. 4 is a perspective view of the base of the fender, the turn-table and upper portions of the trap being removed. Fig. 5 is a perspective view of the inside of the bottom of the cage which sits above the turn-table and fender.

A is a revolving disk which is provided with a series of radial slots $a''$ and mounted upon a spindle $b$ which is connected with suitable clock-work B arranged to cause the disk to revolve as indicated by the arrow in Fig. 1; this disk is provided upon its upper face with a series of movable partitions $a$ hinged to the disk by suitable means such as the downwardly projecting ears $a'$ formed integral with the partitions and each respectively passed through a slot $a''$ provided in the disk. The ears $a'$ are each arranged at practically a right angle with the partition as indicated in Figs. 2 and 3 so that when the partition is flat upon the disk the ear $a'$ will extend downward below the disk A at practically a right angle with such disk.

The receptacle or cage is made in the customary manner of making such receptacles and its bottom is arranged to fit upon the base D. This receptacle may be held in place upon the base D by means of tangs $d$ as shown and by a pivot $d'$ arranged to rest upon the stem $b$ as shown in said Fig. 1. The bottom of the receptacle is closed by a screen of wire cloth $c$ which forms the top of the passage E. $e$ and $e'$ respectively indicate the inner and outer walls of the passage E arranged in the arc of a circle of which the spindle is the center. The rotary disk A forms the floor of this passage. A downwardly projecting stop $c'$ is arranged to project across and practically close the rear end of this passage to prevent the flies from being carried out from under the receptacle C by the rotation of the disk.

F is the partition operating fender arranged upon the base D beneath the disk in the path through which the partition operating ears would normally pass while their partitions respectively were within the passage E, so that when the partition enters the passage E the ear will engage the fender and be thereby forced up against the bottom of the disk, thus throwing the partition into an upright position and closing the passage against the escape of the fly or flies within the passage. The fender terminates at such a point as to allow the partition to fall or be thrown down again when it reaches the stop $c'$ at the rear of the passage E so as to allow the partition to lie flat upon the disk so that it may pass under the stop $c'$.

In order to prevent the escape of the flies after they have once entered the receptacle C I provide a rearwardly inclined slot $c''$ opening upward from the rear of the passage E and opening into the receptacle C and provided at its top with a ledge $c'''$ arranged to project over the mouth of the slot and out into the receptacle a distance beyond the rear wall of such slot.

$A'$ $A'$ represent bait grooves provided in the disk A to hold the bait for the flies.

$d''$ indicates antifriction rollers arranged to support the outer portion of the disk to allow it to revolve easily.

In practice bait is placed in the grooves $A'$, and the clock-work B is wound to impart rotary motion to the disk through the medium of the spindle $b$, (the disk revolving in the direction indicated by the curved arrow in Fig. 1.). The flies attracted by the bait light upon the disk and are carried into the passage E by the rotation of the disk. As the partitions $a$ are carried around, the downwardly projecting ears $a'$ engage, in turn, the partition elevating fender F and are respectively forced upward against the bottom of the disk and thus cause the partitions $a$ to rise, in turn, off of the disk and close the passage E, as the partition enters such passage. The flies are thus caged between the partition $a$ and the downwardly projecting stop $c'$ and are carried against such stop by further rotation of the disk. As soon as the flies are disturbed by being carried against the stop $c'$ they seek for some egress from the passage E and enter through the slot $c''$ into the receptacle C. The projecting ledge $c'''$ prevents them from returning to the passage E. When one partition has nearly reached the stop $c'$ another partition has entered the passage way, and the ear $a'$ of the first partition is released from its engagement with the partition elevating fender F and the partition falls upon the disk A as before and is then free to pass under the stop $c'$. This will be understood by referring to Fig. 2, where a partition is shown just after passing beneath the stop $c'$.

My invention is to be distinguished from those traps in which the partitions are fixed to the disk and project upward therefrom and in which the swinging gates are arranged to be elevated by the partitions as they are carried around there-beneath. Where such gates are employed, the difference of the speed of revolution between the outer and the inner portion of the fixed partitions is such that there is sufficient space left between the outer end of the partition and the outer end of the swinging gate to allow the flies to escape before the inner end of the swinging gate is released from its engagement with the partition. This is also true, although in a less degree, where the gates are made in sections each independent of the other, but in my device there is absolutely no chance for a fly to escape from the passage way E after the egress is closed by the elevation of one of the partitions $a$.

Now, having described my invention, what I claim as new, and desire to secure by Letters Patent, is—

1. A fly trap comprising the combination of a fly receptacle provided with a passage way leading into such receptacle, the floor of such passage way being formed by a portion of the top of a rotating disk; such disk arranged to rotate beneath such receptacle and provided with a series of movable partitions pivoted or hinged to such disk to allow them to fold thereagainst or to stand at an angle thereto to close such passage way when passing therethrough; a suitable stop arranged at the rear end of such passage way to prevent the passage of the flies therebeyond and to allow the passage therebeneath of the partitions when folded against the disk; suitable means arranged to hold the partitions at an angle with the disk to close the passage way and to allow them to fold thereagainst to pass beneath the stop, and suitable means for rotating the disk.

2. In a fly trap having a fly receptacle and a passage way leading into such receptacle the floor of such passage way being formed by a portion of a rotating disk; such disk provided with a series of radial slots extending therethrough; a series of partitions each provided with an ear arranged at substantially right angles with its partition and arranged to pass through the slots in the disk and to project below such disk; the fixed stop arranged to close the rear end of the passage way to prevent the passage therebeyond of the flies and to allow the passage therebeneath of the partitions when folded upon the disk; and the partition operating fender arranged in the path of the downwardly projecting ears to force such ears against the bottom of the disk to thereby elevate the partitions from the disk and cause them to close the passage way and to release such ears to allow the partitions to fold against the disk to pass beneath the stop.

3. In a fly trap the rotating disk provided with a series of radial slots; the pivoted partitions each provided with an ear arranged at an angle with such partition and to pass through the slots in the disk to project beneath such disk, and the partition operating fender arranged in the path of such ears to operate such ears to thereby raise the partitions from the disk, substantially as herein set forth.

4. A fly trap having a fly receptacle, and passage way leading to such receptacle, the inclined slot opening from the rear of such passage way into the receptacle, and the ledge arranged to project over the mouth of the slot and out into the receptacle beyond the wall of such slot, substantially as herein set forth.

JASPER S. MORTON.

Witnesses:
　JAMES R. TOWNSEND,
　ALFRED I. TOWNSEND.